US010115019B2

(12) United States Patent
Chen et al.

(10) Patent No.: US 10,115,019 B2
(45) Date of Patent: Oct. 30, 2018

(54) VIDEO CATEGORIZATION METHOD AND APPARATUS, AND STORAGE MEDIUM

(71) Applicant: Xiaomi Inc., Beijing (CN)

(72) Inventors: Zhijun Chen, Beijing (CN); Wendi Hou, Beijing (CN); Fei Long, Beijing (CN)

(73) Assignee: Xiaomi Inc., Beijing (CN)

( * ) Notice: Subject to any disclaimer, the term of this patent is extended or adjusted under 35 U.S.C. 154(b) by 97 days.

(21) Appl. No.: 15/241,804

(22) Filed: Aug. 19, 2016

(65) Prior Publication Data
US 2017/0154221 A1    Jun. 1, 2017

(30) Foreign Application Priority Data

Dec. 1, 2015   (CN) .......................... 2015 1 0867436

(51) Int. Cl.
*G06K 9/34*   (2006.01)
*G06K 9/46*   (2006.01)
(Continued)

(52) U.S. Cl.
CPC ..... *G06K 9/00718* (2013.01); *G06F 17/3082* (2013.01); *G06F 17/30793* (2013.01);
(Continued)

(58) Field of Classification Search
CPC ............. G06K 9/00718; G06K 9/6215; G06K 9/6267; G06K 9/00268; G06K 9/4671;
(Continued)

(56) References Cited

U.S. PATENT DOCUMENTS 8,452,778 B1 *  5/2013  Song ................... G06K 9/00711
                                                    704/233
8,488,901 B2 *  7/2013  Berestov ............ G06K 9/00664
                                                    345/10

(Continued)

FOREIGN PATENT DOCUMENTS

CN    103207870 A    7/2013
CN    103530652 A    1/2014
(Continued)

OTHER PUBLICATIONS

International Search Report dated Sep. 8, 2016 for International Application No. PCT/CN2015/099610, 12 pages.
(Continued)

*Primary Examiner* — Sheela C Chawan
(74) *Attorney, Agent, or Firm* — Brinks Gilson & Lione (57) ABSTRACT

A video may be categorized into a picture category or a video category. A key frame of the video includes a face and a face feature in the key frame is obtained. Face features respectively associated with a plurality of picture categories are acquired and the video is assigned to one of the picture categories based on a comparison of the key frame face feature and the face features of the picture categories. Videos may first be associated with a video category by comparing key frame face features from the videos, and then the video category may be assigned to a picture category based on comparison of a video category face feature with a plurality of picture category face features. Alternatively, a video may be assigned to a picture category based on matching capture times and capture locations between the video and a reference picture in the picture category.

14 Claims, 8 Drawing Sheets

(51) Int. Cl.
*G06K 9/00* (2006.01)
*G06F 17/30* (2006.01)
*G06K 9/62* (2006.01)
*G11B 27/10* (2006.01)
*H04N 21/845* (2011.01)

(52) U.S. Cl.
CPC ..... *G06K 9/00268* (2013.01); *G06K 9/00288* (2013.01); *G06K 9/4671* (2013.01); *G06K 9/6215* (2013.01); *G06K 9/6218* (2013.01); *G06K 9/6267* (2013.01); *G11B 27/10* (2013.01); *H04N 21/8456* (2013.01)

(58) Field of Classification Search
CPC ... G06K 9/6218; H04N 21/8456; G11B 27/10
USPC ....... 382/118, 164, 173, 100, 170, 197, 190, 382/225, 224, 299, 274, 305; 715/234; 348/211.6; 345/600, 647; 707/609, 738
See application file for complete search history.

(56) References Cited

U.S. PATENT DOCUMENTS

| | | | |
|---|---|---|---|
| 8,605,945 B2* | 12/2013 | El-Maleh | G06K 9/00234 382/103 |
| 9,197,912 B2 | 11/2015 | Raveendran et al. | |
| 9,229,958 B2* | 1/2016 | Zhang | G06F 17/30796 |
| 9,405,771 B2* | 8/2016 | Balakrishnan | G06F 17/30256 |
| 2004/0228504 A1* | 11/2004 | Chang | G06K 9/00288 382/118 |
| 2007/0296863 A1* | 12/2007 | Hwang | G06F 17/30793 348/563 |
| 2014/0193048 A1 | 7/2014 | Zhang et al. | |
| 2014/0375886 A1 | 12/2014 | Galleguillos et al. | |
| 2016/0352979 A1* | 12/2016 | Ilic | G06T 3/4038 |

FOREIGN PATENT DOCUMENTS

| | | |
|---|---|---|
| CN | 103827856 A | 5/2014 |
| CN | 104133875 A | 11/2014 |
| CN | 104284240 A | 1/2015 |
| CN | 104317932 A | 1/2015 |
| CN | 104361128 A | 2/2015 |
| EP | 2 998 960 A1 | 3/2016 |
| JP | 2005-227957 A | 8/2005 |
| JP | 2008-077536 A | 4/2008 |
| JP | 2008-117271 A | 5/2008 |
| JP | 2011-100240 A | 5/2011 |
| JP | 2011-234180 A | 11/2011 |
| RU | 2 402 885 C2 | 10/2010 |
| WO | WO 2009/113505 A1 | 9/2009 |

OTHER PUBLICATIONS

Abdollahian, Golnaz et al., "User Generated Video Annotation Using Geo-Tagged Image Databases," IEEE, 2009, pp. 610-613.
Extended European Search Report dated Feb. 24, 2017 for European Application No. 16176268.7, 9 pages.
Min, Hyun-seok et al., "Semantic Concept Detection for User-Generated Video Content Using a Refined Image Folksonomy," Advances in Multimedia Modeling, LNCS 5916, 2010, pp. 511-521.
Office Action dated Nov. 17, 2017 for Russian Application No. 2016136707/08, 8 pages.
Office Action dated Apr. 2, 2018 for Chinese Application No. 201510867436.5, 7 pages.
Office Action dated Feb. 6, 2018 for Japanese Application No. 2016-523976, 3 pages.

* cited by examiner

VIDEO CATEGORIZATION METHOD AND APPARATUS, AND STORAGE MEDIUM

CROSS-REFERENCE TO RELATED APPLICATIONS

This application claims priority to Chinese Patent Application No. 201510867436.5, filed on Dec. 1, 2015, which is incorporated herein by reference in its entirety.

TECHNICAL FIELD

The present disclosure relates to the technical field of multimedia clustering, and more particularly, to a method, apparatus and storage medium for video categorization.

BACKGROUND OF THE TECHNOLOGY

At present, users may capture multimedia data such as videos and photos using a media capturing apparatus. For photos, face clustering technology may categorize multiple photos, in which the same person appears, into a photo album corresponding to the person. However, this technology is not available for clustering of videos and photos in which the same person appears. A user may manually categorize the videos. However, this manual method is inefficient and lacks intelligent technology.

SUMMARY

In a first aspect, a video categorization method is provided. The method may include acquiring a key frame of a video, which includes a face. A face feature in the key frame may be acquired. One or more face features corresponding to one or more picture categories may be acquired. The method may further include determining, based on the face feature in the key frame and the face features corresponding to the picture categories, a picture category to which the video belongs. The video may then be assigned to the picture category to which the video belongs.

In a second aspect, a video categorization apparatus is provided. The apparatus may comprise a first acquiring module configured to acquire a key frame in a video, which comprises a face. The apparatus may comprise a second acquiring module configured to acquire a face feature in the key frame acquired by the first acquiring module. A third acquiring module of the video categorization apparatus may be configured to acquire one or more face features corresponding to one or more picture categories. A first determining module of the video categorization module may be configured to determine, according to the face feature in the key frame acquired by the second acquiring module and the one or more face features corresponding to the one or more picture categories acquired by the third acquiring module, a picture category to which the video belongs. A first assigning module may be configured to assign the video to the picture category, to which the video belongs that was determined by the first determining module.

According to a third aspect, a video categorization apparatus is provided. The apparatus comprises: a processor and a memory for storing instructions executable by the processor. The processor is configured to:
 acquire a key frame in a video where the key frame comprises a face
 acquire a face feature in the key frame
 acquire one or more face features corresponding to one or more picture categories
 determine, according to the face feature in the key frame and the one or more face features corresponding to the one or more picture categories, a picture category to which the video belongs,
 assign the video to the picture category to which the video belongs.

According to a fourth aspect, there is provided a non-transitory computer-readable storage medium for video categorization. Instructions that are stored on the non-transitory computer-readable storage medium are executed by a processor of a mobile terminal. The instructions cause the mobile terminal to perform a video categorization method. The video categorization method includes acquiring a video key frame that includes a face, acquiring a face feature in the key frame, acquiring one or more face features corresponding to one or more picture categories, determining, according to the face feature in the key frame and the one or more face features corresponding to the one or more picture categories, a picture category to which the video belongs and assigning the video to the picture category to which the video belongs.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure, and together with the description, serve to explain the principles of the disclosure.

DETAILED DESCRIPTION

Reference will now turn to embodiments of the present disclosure, examples of which are illustrated in the accompanying drawings. The following description refers to the accompanying drawings in which the same numbers used in different drawings represent the same or similar elements unless otherwise presented. The exemplary embodiments set forth in the following description do not represent all embodiments consistent with the disclosure. Instead, they are merely examples of apparatuses, methods and storage media consistent with the disclosure and the recited in the claims.

Embodiments of the present disclosure provide an automatic video categorization technology. With this technology, a video may be intelligently and automatically categorized into a picture category that corresponds to a user or face appearing in the video. This method not only eliminates the need for manual video categorization by a user, but also may improve the accuracy of video categorization over a manual process.

Initially, picture categories and methods for generating picture categories will be described. In this regard, one or more pictures may be assigned to or associated with a picture category. The term picture may refer to an image captured by a device, for example, a still photograph or a single frame of a video sequence. Some pictures comprise an image including a face and each of the picture categories may correspond to one face or one person. In other words, for a plurality of pictures included in a picture category, each of the plurality of pictures may include somewhere within the picture, an image of the same face. Therefore, each picture category may comprise a group of pictures that have common facial feature information. The facial feature information that corresponds to a face in a picture may be referred to as a face feature and a face feature may be determined utilizing any suitable face recognition system or method. Some facial recognition technology may identify facial features by extracting "landmarks" or features from an image of a subject's face. For example, relative positions, sizes and shapes of eyes, nose, cheekbones, jaw or outline may be measured and recorded. In some embodiments, this recognition method may be performed by a computing device on a digital image. Each facial feature may correspond to identifier that may be stored on a server for example. However, the present application is not limited to any specific method of determining facial feature information and any suitable method and system may be utilized. In some embodiments, a picture may comprise a digital image or an analog image, and may comprise two or three spatial dimensions, for example.

Various embodiments of the present disclosure may employ the following face clustering method to generate picture categories. However, the present disclosure is not limited with regard to any specific method of generating picture categories. A picture category may be referred to as a category.

In a face clustering method, full-quantity clustering may be used during a first clustering performance for initialization, and incremental clustering may be used for subsequent clustering. In some embodiments, a face clustering method may comprise the following steps A1 to A5.

In step A1, N face features may be obtained from M respective pictures, where N and M are each greater than or equal to 2. At the beginning of the clustering process, each face may be considered to be a category or is associated with a category. Thus, N categories are obtained initially.

In step A2, distances between each two categories among the N categories are calculated. A distance between two categories is a distance between faces belonging respectively to the two categories. In one example, a picture or a category may be referred to as a class. A first class A may have P individual faces; a second class B may have Q individual faces. The distances between the two classes may be calculated by pairwise comparison of the P faces and Q faces for a total of P*Q comparisons and P*Q resulting distances. The minimum distance between the A and B classes may be determined by taking the minimum distance determined in the P*Q comparisons. The average distance between the A and B classes, may be determined by summing the results of the P*Q distances and dividing by P*Q.

In step A3, a distance threshold $\theta$ is predetermined. When a distance between two categories is less than $\theta$, the two categories are considered to be corresponding to the same person or same face, and the two categories are combined into a new category for this iteration. In some embodiments, the threshold may be determined based on an empirical value, for example, a threshold value may be based on a 1/1000 error rate in facial feature recognition results.

In step A4, step A3 may be repeatedly executed to perform an iterative process. The iterative process may be terminated when no new category is generated in an iteration.

In step A5, a total of M categories may be generated as a result, where each category comprises at least one face and one category represents one person.

Figure 1:
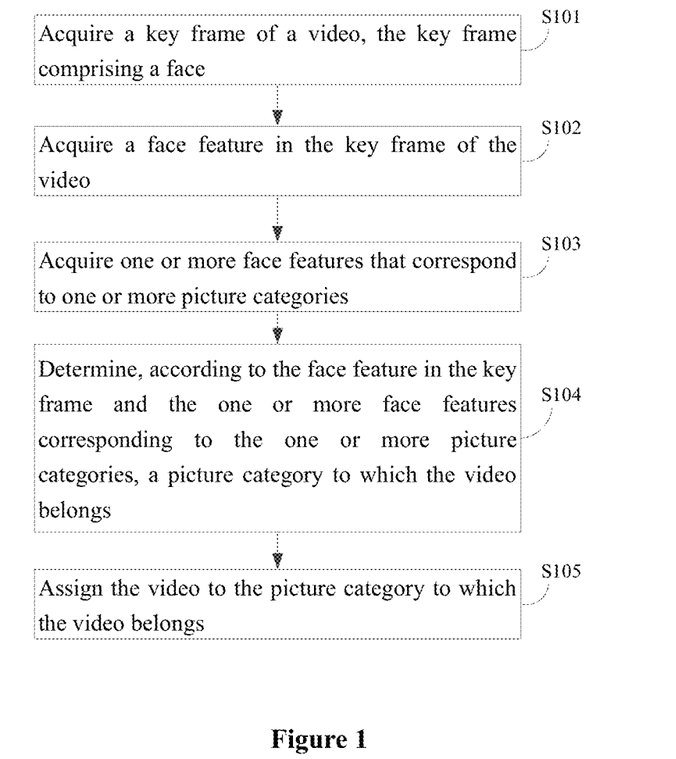
FIG. 1 is a flowchart illustrating a video categorization method according to an exemplary embodiment of the present disclosure.

Now turning to the figures. FIG. 1 is a flowchart illustrating a video categorization method according to an embodiment of the present disclosure. The video categorization method may be performed by an application program for managing multimedia files. In this case, data comprising videos, picture categories and pictures that belong to the picture categories utilized in the categorization method may be stored in a device where the application program is installed. In some embodiments, the categorization method may be performed by an electronic device where multimedia files are stored. In this case, the videos, picture categories and pictures in the picture categories may be stored in the electronic device where multimedia files are stored. The application program or the electronic device may trigger the video categorization method in a variety of ways, for example, automatically on a periodic basis, upon receipt of a user's instruction, or automatically when it is detected that at least one new video is generated. However, timing of a trigger to initiate a video categorization process is not limited to any specific rule and any suitable timing may be utilized to trigger the video categorization process. With these disclosed methods, videos may be intelligently categorized automatically while efficiently saving manpower. As illustrated in FIG. 1, the categorization method comprises steps S101 to S105.

In step S101, a key frame of a video may be acquired where the key frame includes an image that comprises a face of a person. In one embodiment, any one or more video frames that each comprises an image including a face, may be selected from the video as key frames.

Figure 2:
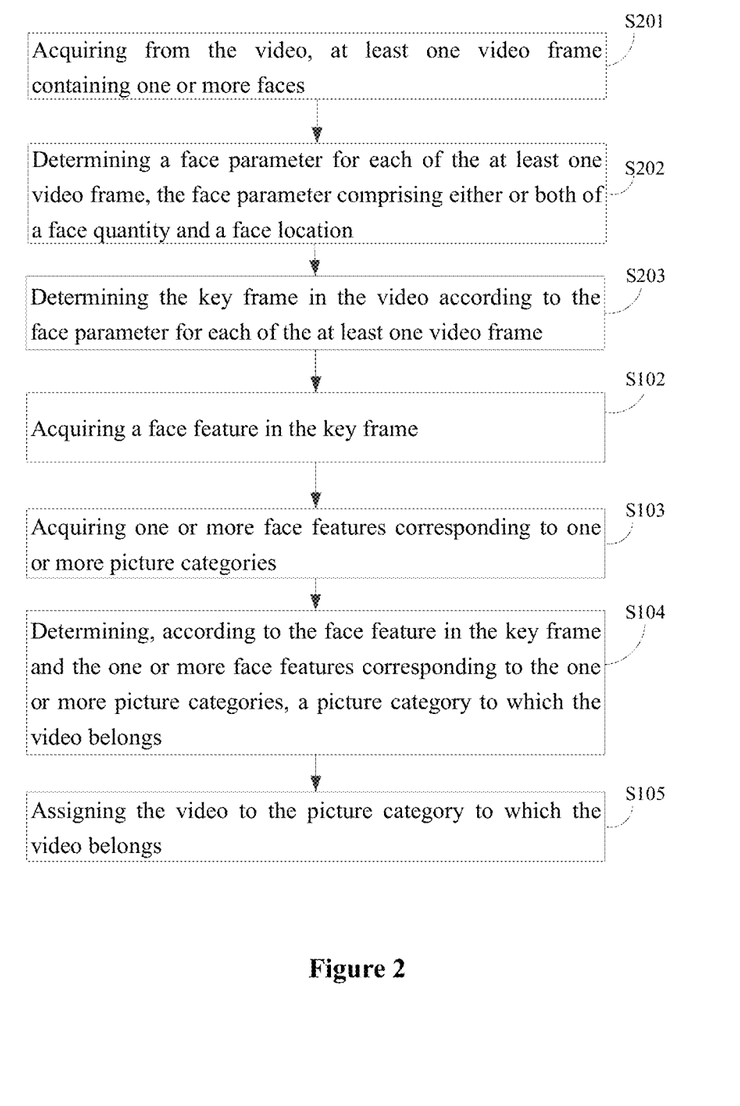
FIG. 2 is a flowchart illustrating a video categorization method according to an exemplary embodiment of the present disclosure.

One method for acquiring a key frame of a video as described in step S101 is illustrated in FIG. 2 as steps S201, S202 and S203. As shown in FIG. 2, step S101 may begin with step S201. In step S201, at least one video frame that comprises an image of one or more faces may be identified from the video. In step S202, a face parameter for each of the at least one identified video frames may be determined where the face parameter comprises either or both of a face quantity and a face location. The face quantity may indicate the number of faces identified in the video frame and the face location may indicate the locations within the video frame where a face or faces occurs. In step S203, the key frame in the video may be determined based on the face parameter for each of the at least one identified video frames.

Furthermore, step S203 may comprise any one or both of the following Examples 1 and 2.

Example 1: Determine or select one or more non-duplicate video frames based on the ace parameters for each of the at least one identified video frames, where the one or more non-duplicate video frames each has a face parameter that does not reoccur for other video frames. Determine or select at least one of the non-duplicate video frames as a key frame. A non-duplicate video frame may refer to a video frame that has a face parameter different from that of any other video frame in the video. In other words, a non-duplicate video frame may comprise a face that does not reappear in other video frames. Therefore, any one or more non-duplicate video frames may be selected as a key frame.

Example 2: Determine or select at least one group of duplicate video frames having the same face parameter based on the face parameter for each of the at least one video frames. Each group of duplicate video frames may comprise at least two video frames. In some embodiments, a difference between frame capture times of a latest captured video frame and an earliest captured video frame in each group of duplicate video frames may be less than or equal to a specified or predetermined time duration. All the video frames in each group of duplicate video frames may have the same face parameter, and any one of each group of duplicate video frames may be determined to be or selected to be a key frame. The capture times for video frames may be determined based on the time an image capturing device captures or stores the video frames, or based on the number of and/or order of video frames. However, the application is not limited with regard to how the capture times are measured or determined and any suitable method may be utilized.

The specified or predetermined time duration for a group of duplicate video frames may be configured in advance of the key frame acquisition process. It is noted that since a substantially same image in a video sequence typically does not last for a long time, the predetermined time duration may not need to be too long. For example, considering video that is displayed at 24 frames per second, the predetermined time duration may be controlled to be within N/24 seconds, where N is greater than or equal to 1 and less than or equal to 24 (or 36, or another numerical value, which may be defined as needed). However, the application is not limited with regard to any specific length of the predetermined time duration. The shorter the predetermined time duration, the more accurate may be the selected key frame. Thus, video frames in each group of duplicate video frames may comprise the same face, i.e., the same face may appear in the plurality of video frames in a group of duplicate frames. Therefore, any video frame in each group of duplicate video frames may be selected as a key frame, thereby eliminating duplication and improving efficiency in selecting a key frame.

The above examples 1 and 2 may be applied separately or in combination.

Returning to FIG. 1 and resuming at step S102, a face feature in the key frame may be acquired, for example, utilizing any suitable facial recognition technology. In step S103, one or more face features may be acquired where the one or more face features correspond to or are associated with one or more picture categories. For example, different categories may include specified individuals, children, friends or parents. In some embodiments, the picture categories may be stored in a server. In step S104, a picture category to which the video belongs may be determined according to a face feature in a key frame of the video and the one or more face features corresponding to or associated with the one or more picture categories. In step S105, the video may be assigned to the determined picture category to which the video belongs.

Based on the described methods of the present disclosure, a video may be intelligently and automatically classified into a picture category that corresponds to a user or a face appearing in the video, thereby eliminating the need for manual categorization by a user. In addition, as the video categorization may be conducted based on a face feature, video categorization accuracy may be improved.

In one embodiment, step S104 described above with respect to FIG. 1 may be implemented as the following steps B1 to B3. In step B1, a picture category for a video key frame may be selected from one or more picture categories that correspond to or are associated with one or more respective face features. For example, a picture category associated with a face feature that matches a face feature associated with the key frame may be determined or selected to be a picture category to which the video belongs. For example, the above-described face clustering steps A1 to A5 may be performed to determine a picture category for the video. Through a face clustering process, a picture category to which a video key frame belongs may be determined based on a face feature from the video key frame. The picture category to which the key frame belongs may be associated with a face feature that matches the face feature in the key frame. In step B2, the matching picture category determined in step B1 may be determined or selected to be the picture category to which the video belongs.

In another embodiment, step S104 described above with respect to FIG. 1 may be implemented as the following steps C1 to C3.

In step C1, when there are at least two videos to categorize, each video comprises at least one key frame and a face feature is identified or determined from each respective key frame. In step C2, face clustering may be performed for the at least two videos based on the face features in the respective key frames to obtain or define at least one video category, where one video category corresponds to one face. More specifically, at least one category may be obtained or defined by performing face clustering for each key frame of each video according to the face clustering method of the above-described steps A1 to A5. Here, a category may be a video category, and thus each video category may correspond to a face feature. Moreover, a video category to which a key frame of a video belongs may also be a video category to which the video belongs. In step C3, based on a face feature associated with a video category and one or more face features associated with one or more picture categories, a picture category associated with the same face feature as the video category may be identified or determined. In step S105 the video in the video category may be assigned to the identified or determined picture category that is associated with the same face feature as the video category. Step C3 may be repeated for each of the at least two videos. According to this implementation, video categorization may be realized by first performing face clustering for videos to obtain video categories, then performing face clustering for the video categories and picture categories to determine, for each of the video categories, a picture category that corresponds to the same face feature as the video category, and next assigning each video in each video category to the picture category that corresponds to the same face as the respective video category.

Figure 2A:
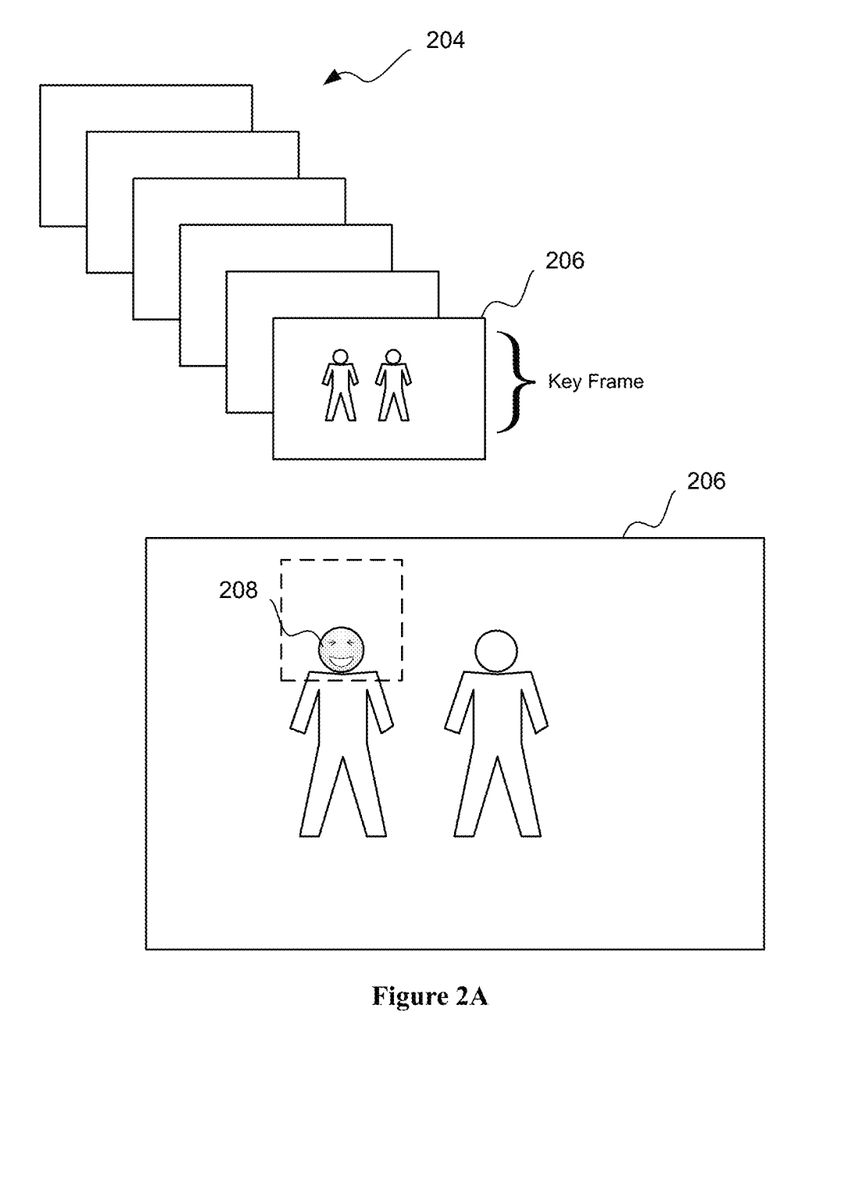
FIG. 2A is a diagram illustrating a key frame in a sequence of video frames that includes an image of a face with facial features.

FIG. 2A is a diagram illustrating a key frame in a sequence of video frames that includes an image of a face with facial features. Referring to FIG. 2A, there is shown a sequence of video frames 204 that includes a frame selected as a key frame 206. Facial features 208 may be identified in the key frame 206. The facial features 208 may include data that characterizes a face in the key frame 206 image and may be utilized to determine a picture category that includes images with a person having substantially the same facial features 208. For example, a picture category may include a number of images or pictures that each includes at least one set of facial features, each set corresponding to one face. The facial features 208 may be compared to facial features associated with one or more picture categories in order to identify a picture category that includes pictures having substantially the same facial features 208 as included in the key frame 206 of the video frame sequence 204. In this manner, a picture category to which the video frame sequence 204 belongs may be determined and the video 204 may be assigned to that determined picture category. The video frame sequence 204 may be referred to as a video 204.

Figure 3:
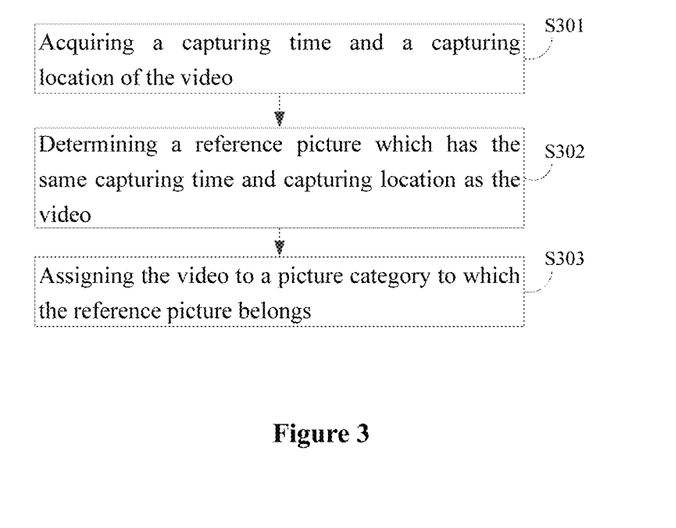
FIG. 3 is a flowchart illustrating a video categorization method according to an exemplary embodiment of the present disclosure.

In one embodiment, a video categorization method may be realized in the following manner where face clustering may not be performed. For example, it may generally be noted that as long as a video and a picture, for example a still photo or another video, have substantially a same time of capture and same capture location, the same person may appear in both of the video and the picture. Therefore, the video and the picture may be classified into the same category or same picture category. In this manner, video categorization may be done quickly with a certain accuracy. As illustrated in FIG. 3, the above method may include steps S301 to S303. In step S301, a capturing time and a capturing location of a video may be acquired or recorded. In step 302, a reference picture that has substantially the same capturing time and the same capturing location as the video may be determined or selected. In step S303, the video may be assigned to a picture category to which the reference picture belongs.

The application is not limited to any specific way of measuring or determining capture times and capture locations of an image, video frame or video sequence, and any suitable means may be utilized for determining the capture times and locations. In some systems, a capture time may be obtained from an internal clock, a network, user input or a geolocation determination unit such as a global positioning system (GPS) receiver, for example. A capturing location may indicate a location or place where an apparatus or device captures an image, video or a portion of a video. Capture location information may also be obtained from a geolocation determination unit, a network or user input, for example. Capture times and/or capture locations may be obtained and utilized in real time as images and videos are captured. Alternatively, capture times and/or capture locations may be associated with an image, video or video sequence and may be stored in a memory device for later use.

Another aspect of the embodiments of the present disclosure provides a video categorization apparatus. The video categorization apparatus may comprise suitable circuitry, code, logic and interfaces that may be utilized for video categorization. Data comprising video, video categories, picture categories and pictures associated with the picture categories may be stored in a memory device and may be retrieved, acquired, identified or obtained during video categorization. In some embodiments, the video categorization apparatus may be used with an application program for managing multimedia files. In this example, data for the videos, the video categories, the picture categories and the pictures in the picture categories that are utilized by the video categorization apparatus, may refer to the same data being stored in a device where the application program is installed. In some embodiments, the video categorization apparatus may be utilized with an electronic device where multimedia files are stored. In this example, data for the videos, the video categories, the picture categories and the pictures in the picture categories utilized by the video categorization apparatus may refer to the same data being stored in the electronic device. The application program or the electronic device may trigger the video categorization apparatus to perform categorization operations, for example, automatically on a periodic basis, upon receipt of a user's instruction, or automatically when it is detected that at least one new video is generated. However, the application is not limited with regard to these examples, and any suitable method may be utilized to time a trigger or initiate a trigger for operation of the video categorization apparatus. In this manner, videos may be intelligently and efficiently categorized automatically, thereby efficiently saving manpower.

Figure 4:
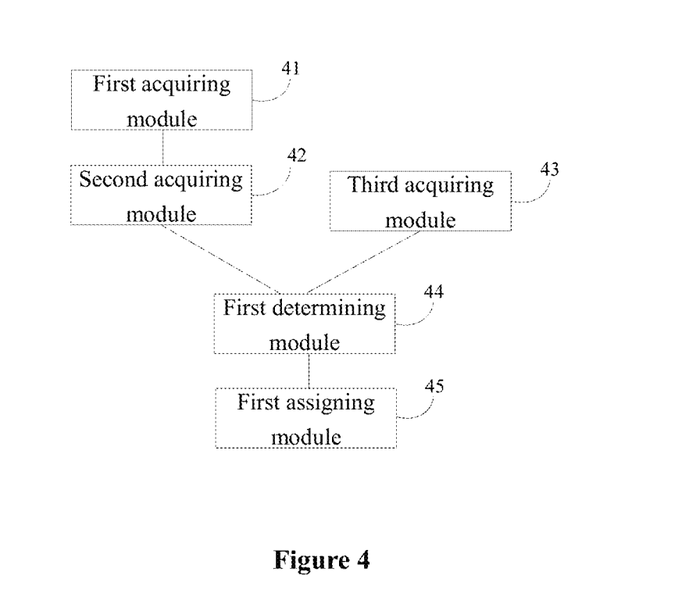
FIG. 4 is a block diagram illustrating a video categorization apparatus according to an exemplary embodiment of the present disclosure.

Referring to FIG. 4, the video categorization apparatus may comprise a first acquiring module 41 that may be configured to acquire or identify a key frame in a video, where the key frame may comprise an image that includes a face. Also, a second acquiring module 42 may be configured to acquire or identify a face feature of the key frame. The face feature may include data that may characterize the face in the key frame image. A third acquiring module 43 may be configured to acquire or identify one or more face features that correspond respectively to one or more picture categories. Moreover, a first determining module 44 may be configured to determine to which of the one or more picture categories the video belongs, based on the face feature of the key frame of the video and the one or more face features respectively corresponding to the one or more picture categories. Furthermore, a first assigning module 45 may be configured to assign the video to the picture category to which the video belongs as determined by the first determining module 44. In this manner, the video categorization apparatus may enable a video to be intelligently and automatically classified into a picture category that corresponds to a user or a face appearing in the video, thereby eliminating the need for manual categorization by a user. In addition, accuracy of video categorization may be improved because the automatic categorization may be conducted based on face feature data.

Figure 5:
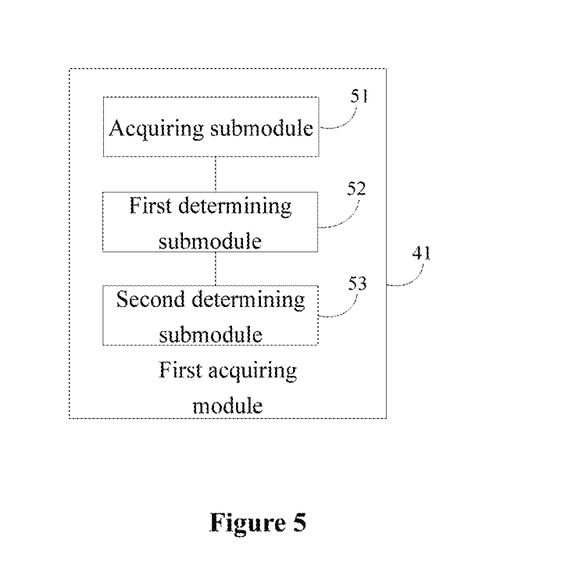
FIG. 5 is a block diagram illustrating a video categorization apparatus according to an exemplary embodiment of the present disclosure.

Now referring to FIG. 5, the first acquiring module 41, described with respect to FIG. 4, may comprise an acquiring submodule 51 that may be configured to acquire at least one video frame from the video. The video frame may comprise an image that includes one or more faces. Also, a first determining submodule 52 may be configured to determine a face parameter for each of the at least one video frames acquired by the acquiring submodule 51, where the face parameter may comprise either or both of a face quantity and a face location. A second determining submodule 53 may be configured to determine a key frame in the video based on the face parameter for each of the at least one video frames.

The number of faces in a video frame or image refers to a count of faces in the video frame where a video frame or image may include one or more faces. Each face in the video frame has a corresponding face location. A face location may refer to a location of a face in the video frame, and may be represented by pixels occupied by the face in the video frame or by coordinates of the face within the video frame.

In one embodiment, the face quantity and locations may be determined by performing facial recognition on the video frame and recognizing faces within the video frame; for each recognized face, determine a location of a predetermined part of each face in the video frame, where the predetermined part may be one or more of a face profile, eyes, a mouth and/or a nose, for example. The determined location may be identified as the face location. The location of the predetermined facial part in the video frame may be represented by the pixels occupied by the predetermined part in the video frame or by the coordinates of the predetermined part in the video frame. However, the application is not limited with respect to any specific method for determining the face quantities and locations and any suitable method may be utilized.

In one embodiment, the second determining submodule 53 may be further configured to determine or select, according to the face parameter for each of the at least one video frames, one or more non-duplicate video frames, where each non-duplicate video frame has a face parameter that does not reoccur for other video frames. The second determining submodule 53 may also determine or select at least one of the non-duplicate video frames as a key frame. More specifically, a non-duplicate video frame may refer to a video frame that has a face parameter different from that of any other video frame, or in other words, which comprises a face that does not reappear in another video frame. Therefore, any one or more non-duplicate video frames may be selected as key frames.

In one embodiment, the second determining submodule 53 may be further configured to determine, according to the face parameters for each of the at least one video frames, at least one group of duplicate video frames, where each video frame in a group of duplicate video frames may have a same face parameter. Each group of duplicate video frames may comprise at least two video frames. In some embodiments, a difference between capturing times of a latest captured video frame and an earliest captured video frame in each group of duplicate video frames may be less than or equal to a predetermined time duration. Furthermore, all the video frames in each group of duplicate video frames may have a same face parameter. The determining submodule 53 may also be configured to determine or select any one video frame in each group of duplicate video frames to be the key frame.

With respect to a group of duplicate video frames, the predetermined time duration may be configured in advance. Since the same image or a group of duplicate images in a video may not last for a long time, the predetermined time duration may not be too long. For example, considering a video that is displayed at 24 frames per second, the predetermined time duration may be controlled to be within N/24 seconds, where N may be greater than or equal to 1 and less than or equal to 24 (or 36, or another numerical value, which may be defined as needed). The shorter the predetermined time duration, the more accurate the selected key frame may be. Thus, video frames in each group of duplicate video frames may comprise the same face, in other words, the same face may appear in each of the video frames included in a group of duplicate video frames. Therefore, any video frame in each group of duplicate video frames may be selected as a key frame, thereby eliminating duplication of key frames and improving the efficiency of selecting a key frame.

Figure 6:
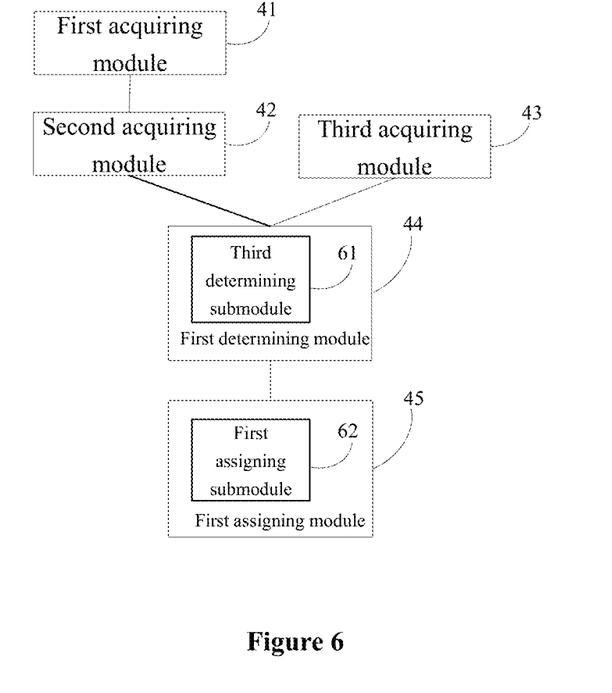
FIG. 6 is a block diagram illustrating a video categorization apparatus according to an exemplary embodiment of the present disclosure.

Referring to FIG. 6, there is shown the first acquiring module 41, the second acquiring module 42, the third acquiring module 43, the first determining module 44 and the first assigning module 45. The first determining module 44, described with respect to FIG. 4, may comprise additional detail including a third determining submodule 61. In instances when there are at least two videos under consideration, the third determining submodule 61 may be configured to determine face features in key frames from each of the at least two videos. Submodule 61 may also perform face clustering for the at least two videos based on face features in the key frames from each of the at least two videos, to obtain at least one video category, where one video category may correspond to one face or person. More specifically, at least one category may be obtained by performing face clustering on each key frame according to the face clustering method described with respect to steps A1 to A5. Here, one category refers to one video category, and thus each video category may correspond to one face feature. Furthermore, a video category to which a key frame of a video belongs may be a video category to which the video belongs.

In some embodiments, the third determining submodule 61 may further be configured to determine, according to a face feature that corresponds to a video category and face features that correspond to picture categories, a picture category that corresponds to the same face feature as corresponds to the video category.

The first assigning module 45, described with respect to FIG. 4, may comprise additional detail including a first assigning submodule 62. The first assigning submodule 62 may be configured to assign each video in a video category (as determined by the third determining submodule 61) to the picture category that corresponds to the same face feature as corresponds to the video category.

The above apparatus may realize video categorization by first performing face clustering in a plurality of videos to obtain video categories, then performing face clustering for the video categories and picture categories to determine, for each of the video categories, a picture category which corresponds to the same face as the video category. The video in each video category may then be assigned to the picture category which corresponds to the same face as the video category.

Figure 7:
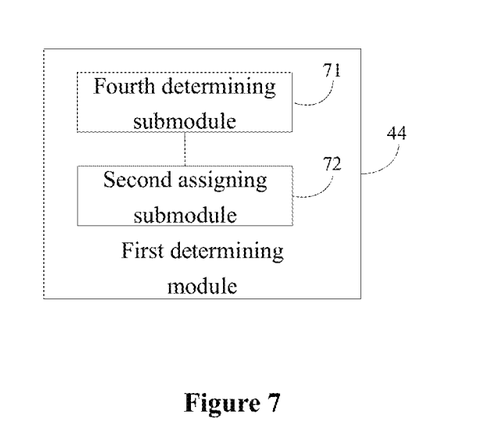
FIG. 7 is a block diagram illustrating a video categorization apparatus according to an exemplary embodiment of the present disclosure.

Now referring to FIG. 7, the first determining module 44, described with respect to FIG. 4, may comprise a fourth determining submodule 77. The fourth determining module 77 may be configured to determine, from one or more picture categories that correspond to one or more face features, a picture category matching a face feature in a video key frame. The first determining module 44 may also include a second assigning submodule 72 that may be configured to assign the matching picture category determined by the fourth determining submodule 71 as the picture category to which the video belongs.

Figure 8:
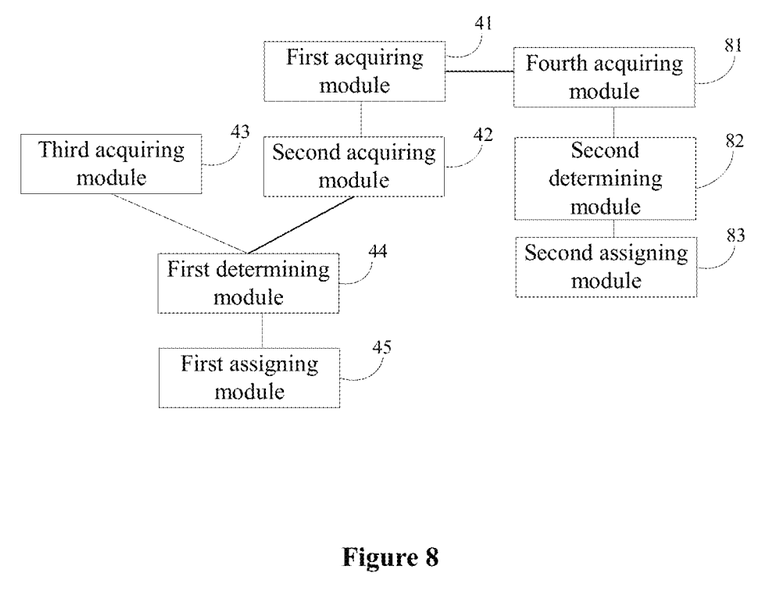
FIG. 8 is a block diagram illustrating a video categorization apparatus according to an exemplary embodiment of the present disclosure.

Referring to FIG. 8, there is shown the first acquiring module 41, the second acquiring module 42, the third acquiring module 43, the first determining module 44 the first assigning module 45, a fourth acquiring module 81, a second determining module 82 and a second assigning module 83.

The fourth acquiring module 81 may be configured to acquire a capturing time and a capturing location associated with a video. The second determining module 82 may be configured to determine a reference picture that may be associated with the same capturing time and capturing location as that of the video. The second assigning module 83 may be configured to assign the video to a picture category to which the reference picture belongs.

The above described apparatus may not utilize face clustering for categorizing a video and picture and may instead determine or decide that in instances when a video and a picture have the same capturing time and the same capturing location, a particular person may appear in both of the video and the picture. Thus, the video and picture may be classified into the same category. In this manner, categorization can be done quickly with a certain accuracy.

In another aspect of the present disclosure, a video categorization apparatus may comprise a processor operable to execute software instructions and a memory for storing the software instructions. The software instructions when executed by the processor may cause the processor to perform video categorization where videos and pictures or multiple videos may be included in the same category in instances when they include images of the same face. In this regard, the processor may acquire a key frame of a video where the key frame may comprise an image of a face. The processor may further acquire facial feature information corresponding to the face in the key frame. One or more face features that correspond to one or more picture categories respectively may also be obtained by the processor. Based on the facial feature information associated with the key frame and the one or more facial features associated with the one or more picture categories, the processor may determine or select a picture category to which the video belongs and may assign the video to the picture category.

Figure 9:
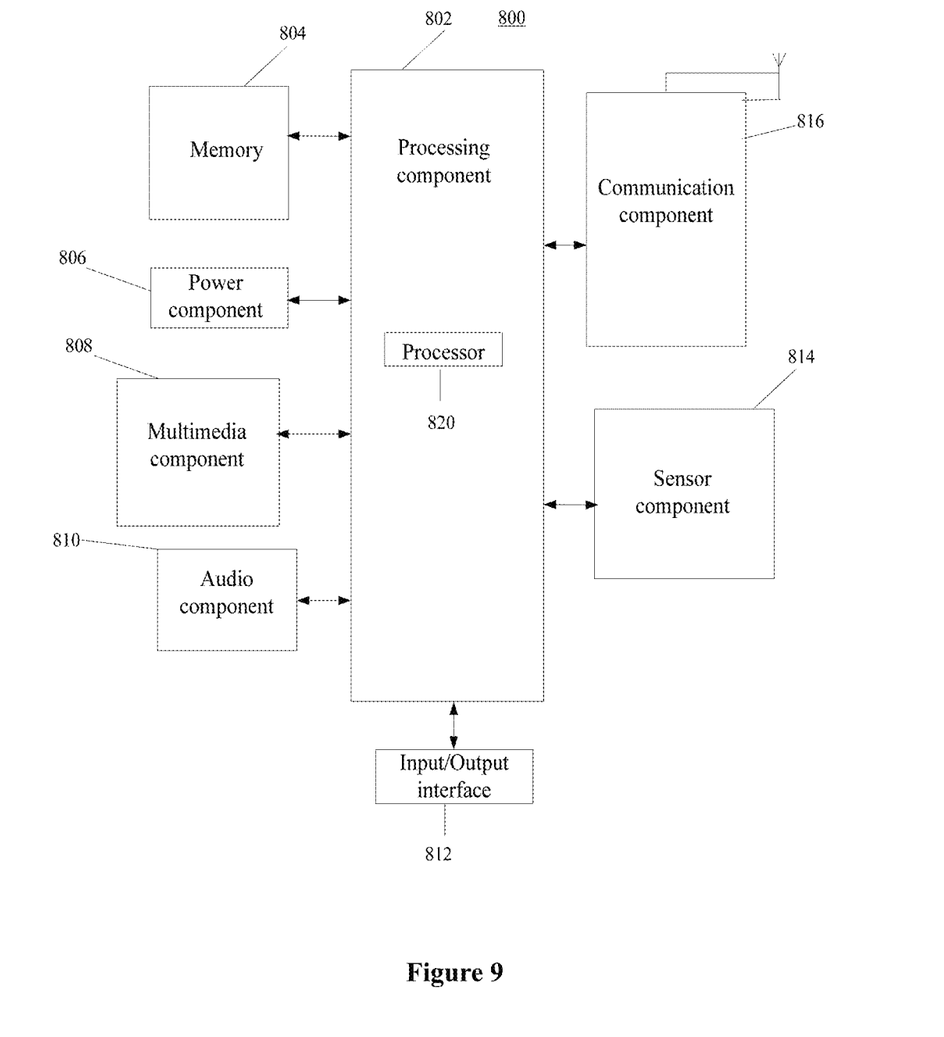
FIG. 9 is a block diagram illustrating a video categorization apparatus according to an exemplary embodiment of the present disclosure.

FIG. 9 is a block diagram illustrating an apparatus 800 for video categorization according to an exemplary embodiment of the present disclosure. The apparatus 800 may be, for example, a mobile phone, a computer, a digital broadcast terminal, a messaging device, a gaming console, a tablet, a medical device, exercise equipment, a personal digital assistant, or the like.

Referring to FIG. 9, the apparatus 800 may include one or more of the following hardware, software or hardware and software components: a processing component 802, a memory 804, a power component 806, a multimedia component 808, an audio component 810, an input/output (I/O) interface 812, a sensor component 814, and a communication component 816.

The processing component 802 may control operations of the apparatus 800, for example, operations associated with video and picture categorization, image display, telephone calls, data communications, camera operations, and recording operations. The processing component 802 may include one or more processors 820 that may execute instructions to perform all or a part of the steps in the above-described methods. Moreover, the processing component 802 may include one or more hardware, software or hardware and software modules that facilitate the interaction between the processing component 802 and other components of the apparatus 800. For example, the processing component 802 may include a multimedia module to facilitate the interaction between a multimedia component 808 and the processing component 802.

The memory 804 is configured to store various types of data to support operations of the apparatus 800. Examples of such data includes instructions for video categorization and other applications or methods performed by the apparatus 800, contact data, phonebook data, messages, pictures, videos, and the like. For example, the memory 804 may store data comprising the videos, key frames, face features and picture categories described with respect to FIGS. 1-8. The memory 804 may comprise any suitable type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 may provide power to the various components of the apparatus 800. The power component 806 may include a power management system, one or more power supplies, and other components associated with generation, management, and distribution of power in the apparatus 800.

The multimedia component 808 may include a display screen that provides an output interface for the apparatus 800 to a user or users. In some embodiments, the display screen may include a liquid crystal display (LCD) and a touch panel (TP). If the screen includes the touch panel, the screen may be implemented as a touch screen to receive input signals from the user. The touch panel may include one or more touch sensors to sense user touches, swipes, and gestures on the touch panel. The touch sensors may not only sense a boundary of a touch or swipe action, but may also sense a period of time and a pressure associated with a touch or swipe action. In some embodiments, the multimedia component 808 may include a front camera and/or a rear camera. The front camera and/or the rear camera may receive external multimedia data when the apparatus 800 is in an operation mode, for example, a photographing mode or a video mode for capturing a photo or video, for example. Each of the front camera and the rear camera may be a fixed optical lens system or have focus and optical zoom capability.

The audio component 810 may be configured to output and/or input audio signals. For example, the audio component 810 may include a microphone (MIC) configured to receive an audible sound or external audio signal when the apparatus 800 is in an operation mode, such as a call mode, a recording mode, or a voice recognition mode. The received audio signal may be stored in the memory 804 or transmitted via the communication component 816. In some embodiments, the audio component 810 further includes a speaker to output audio signals.

The I/O interface 812 provides an interface between the processing component 802 and a peripheral interface module, such as a keyboard, touch screen, a click wheel, a mechanical or virtual button, or the like. The buttons may include, but are not limited to, a home button, a volume button, a starting button, and a locking button.

The sensor component 814 may include one or more sensors to provide status assessments of various aspects of the apparatus 800. For example, the sensor component 814 may detect an open/closed status of the apparatus 800, relative positioning of components, for example, the display and the keypad of the apparatus 800. The sensor component 814 may further detect a change in position of the apparatus 800 or of a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. For example, the light sensor may capture images as photographs or videos that may be categorized in picture categories, picture and video categories or video categories. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the apparatus 800 and other devices. The apparatus 800 may access a wireless network based on a communication standard, such as WiFi, 2G, or 3G, 4G or a combination thereof. However, the invention is not limited to any specific type of communication technology. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies. In some embodiments, images such as photographs, videos, picture categories and video categories may be received by the apparatus 800 via the communication component 816 and stored in the memory 804.

The apparatus 800 may be implemented utilizing one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In some embodiments, a non-transitory computer-readable storage medium may be provided that comprises instructions such as those included in the memory 804. The instructions may be executable by the processor 820 in the apparatus 800 for performing the above-described methods including video categorization. The non-transitory computer-readable storage medium may comprise, for example, a ROM, a random access memory (RAM), a compact disc read-only memory (CD-ROM), a magnetic tape, a floppy disc, an optical data storage device, or the like.

In some embodiments, a non-transitory computer-readable storage medium may store instructions such that when executed by a processor of a mobile terminal, the instructions may cause the mobile terminal to perform a video categorization method. The video categorization method performed by the mobile may include acquiring a key frame of a video, where the key frame comprises an image of a face. The mobile terminal may also acquire a face feature in the key frame of the video and acquire one or more face features that correspond to one or more picture categories. The mobile terminal may then determine or select one of the picture categories to which the video belongs based on the face feature in the key frame and the one or more face features corresponding to the one or more picture categories and may assign the video to the selected picture category. In some embodiments, the picture category corresponding to a face feature that matches the face feature from the key frame, may be selected as the picture category to which the video belongs.

Other embodiments of the present disclosure will be apparent to those skilled in the art from consideration of the specification and practice of the embodiments disclosed herein. This application is intended to cover any variations, uses, or adaptations of the present disclosure following the general principles of the disclosure and including such departures from the present disclosure as falls within common knowledge or customary technical means in the art. It is intended that the specification and embodiments be considered as example embodiments only, with a true scope and spirit of the present disclosure being indicated by the appended claims.

Each module or unit discussed above for FIGS. 4-8, such as the acquiring modules and submodules, the determining modules and submodules, and the assigning modules and submodules, may take the form of a packaged functional hardware unit designed for use with other components, a portion of a program code (e.g., software or firmware) executable by the processor 820 or the processing circuitry that usually performs a particular function of related functions, or a self-contained hardware or software component that interfaces with a larger system, for example.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It will be appreciated that the present disclosure is not limited to the exact construction that has been described above and illustrated in the accompanying drawings, and that various modifications and changes can be made without departing from the scope thereof.

We claim:

1. A video categorization method, the method comprising:
acquiring a key frame from a video, the key frame comprising an image including a face;
acquiring a face feature from the key frame of the video;
acquiring one or more face features that correspond to one or more respective picture categories;
selecting a picture category to which the video belongs based on the face feature from the key frame and the one or more face features corresponding to the one or more respective picture categories;
assigning the video to the picture category to which the video belongs;
wherein the acquiring the key frame from the video comprises:
acquiring, from the video, at least one video frame comprising one or more faces,
determining a face parameter for each of the at least one video frame, the face parameter comprising either or both of a face quantity and a face location, and
determining the key frame from the video, based on the face parameter for each of the at least one video frame; and
wherein determining the key frame in the video according to the face parameter for each of the at least one video frame comprises:
determining, according to the face parameter for each of the at least one video frame, one or more non-duplicate video frames each having a face parameter that does not reoccur for other video frames, and selecting at least one of the non-duplicate video frames as the key frame.

2. The method according to claim 1, wherein the determining the key frame in the video according to the face parameter for each of the at least one video frame comprises:
determining, according to the face parameter for each of the at least one video frame, at least one group of duplicate video frames having a same face parameter, each group of duplicate video frames comprising at least two video frames, wherein a difference between capturing times of a latest captured video frame and an earliest captured video frame in each group of duplicate video frames is less than or equal to a predetermined time duration, and all the video frames in each group of duplicate video frames has a same face parameter; and
selecting any one of each group of duplicate video frames as the key frame.

3. The method according to claim 1, wherein selecting the picture category to which the video belongs comprises:
in instances when there are at least two videos to categorize, determining a face feature in a key frame of each of the videos;
performing face clustering for the at least two videos based on the face feature in the key frame of each of the at least two videos, to identify at least one video category; and
selecting a picture category for each of the at least one video category, where each picture category corresponds to the same face feature as does a corresponding one of the at least one video category, each selection based on comparison of a face feature that corresponds to a respective one of the at least one video category and the one or more face features corresponding to the one or more picture categories, and
the assigning the video to the picture category to which the video belongs comprises:
assigning each video in each respective one of the at least one video category to the picture category that corresponds to a same face feature as corresponds to the respective one of the at least one video category.

4. The method according to claim 1, wherein the selecting the picture category to which the video belongs comprises:
determining, from the one or more picture categories that correspond to the one or more face features, a picture category that corresponds to a face feature that matches the face feature in the key frame; and
identifying the matching picture category as the picture category to which the video belongs.

5. The method according to claim 1, wherein the method further comprises:
acquiring a capturing time and a capturing location of the video;
determining a reference picture which has a same capturing time and capturing location as the video; and
assigning the video to a picture category to which the reference picture belongs.

6. A video categorization apparatus, the video categorization apparatus comprising:
a processor; and
a memory for storing instructions executable by the processor, wherein the processor is configured to:
acquire a key frame from a video, the key frame comprising an image including a face;
acquire a face feature from the key frame of the video;
acquire one or more face features that correspond to one or more respective picture categories;
select a picture category to which the video belongs based on the face feature from the key frame and the one or more face features corresponding to the one or more respective picture categories;
assign the video to the picture category to which the video belongs;
acquire, from the video, at least one video frame comprising one or more faces;
determine a face parameter for each of the at least one video frame, the face parameter comprising either or both of a face quantity and a face location;
determine the key frame from the video, based on the face parameter for each of the at least one video frame;
determine, according to the face parameter for each of the at least one video frame, one or more non-duplicate video frames each having a face parameter that does not reoccur for other video frames; and
select at least one of the non-duplicate video frames as the key frame.

7. The apparatus of claim 6, wherein the processor is further configured to:
determine, according to the face parameter for each of the at least one video frame, at least one group of duplicate video frames having the same face parameter, each group of duplicate video frames comprising at least two video frames, wherein a difference between capturing times of a latest captured video frame and an earliest captured video frame in each group of duplicate video frames is less than or equal to a predetermined time duration, and all the video frames in each group of duplicate video frames have the same face parameter; and
select any one of each group of duplicate video frames as the key frame.

8. The apparatus of claim 6, wherein the processor is further configured to:
in instances when there are at least two videos to categorize, determine a face feature in a key frame in each of the videos;
perform face clustering for the at least two videos based on the face feature in the key frame of each of the at least two videos, to identify at least one video category;
select a picture category for each of the at least one video category, where each picture category corresponds to a same face feature as does a corresponding one of the least one video category, each selection based on a comparison of a face feature that corresponds to a respective one of the at least one video category and the one or more face features corresponding to the one or more respective picture categories; and
assign each video in each respective one of the at least one video category to the picture category which corresponds to the same face feature as does the respective one of the at least one video category.

9. The apparatus of claim 6, wherein the processor is further configured to:
determine, from the one or more picture categories that correspond to the one or more face features, a picture category that corresponds to a face feature that matches the face feature in the key frame; and
identify the matching picture category as the picture category to which the video belongs.

10. A non-transitory computer-readable storage medium having stored thereon computer program instructions that, when executed by a processor of a mobile terminal, causes the mobile terminal to:

acquire a key frame from a video, the key frame comprising a face;

acquire a face feature from the key frame;

acquire one or more face features that correspond to one or more respective picture categories;

select a picture category to which the video belongs based on the face feature from the key frame and the one or more face features corresponding to the one or more respective picture categories;

acquire, from the video, at least one video frame comprising one or more faces;

determine a face parameter for each of the at least one video frame, the face parameter comprising either or both of a face quantity and a face location;

determine the key frame from the video, based on the face parameter for each of the at least one video frame;

determine, according to the face parameter for each of the at least one video frame, one or more non-duplicate video frames each having a face parameter that does not reoccur for other video frames; and select at least one of the non-duplicate video frames as the key frame.

11. The non-transitory computer-readable storage medium of claim 10, wherein the computer program instructions further comprise instructions to cause the mobile terminal to:

determine, according to the face parameter for each of the at least one video frame, at least one group of duplicate video frames having the same face parameter, each group of duplicate video frames comprising at least two video frames, wherein a difference between capturing times of a latest captured video frame and an earliest captured video frame in each group of duplicate video frames is less than or equal to a predetermined time duration, all the video frames in each group of duplicate video frames has a same face parameter; and select any one of each group of duplicate video frames as the key frame.

12. The non-transitory computer-readable storage medium of claim 10, wherein the computer program instructions further comprise instructions to cause the mobile terminal to:

in instances when there are at least two videos to categorize, determine a face feature in a key frame of each of the videos;

perform face clustering for the at least two videos based on the face feature in the key frame of each of the at least two videos, to identify at least one video category;

select a picture category for each of the at least one video category, where each picture category corresponds to the same face feature as does a corresponding one of the at least one video category, each selection based on a comparison of a face feature that corresponds to a respective one of the at least one video category and the one or more face features corresponding to the one or more picture categories; and assign each video in each respective one of the at least one video category to the picture category that corresponds to the same face feature as corresponds to the respective one of the at least one video category.

13. The non-transitory computer-readable storage medium of claim 10, wherein the computer program instructions further comprise instructions to cause the mobile terminal to:

determine, from the one or more picture categories that correspond to the one or more face features, a picture category that corresponds to a face feature that matches the face feature in the key frame; and identify the matching picture category as the picture category to which the video belongs.

14. The non-transitory computer-readable storage medium of claim 10, wherein the computer program instructions further comprise instructions to cause the mobile terminal to:

acquire a capturing time and a capturing location of the video;

determine a reference picture which has the same capturing time and capturing location as the video; and assign the video to a picture category to which the reference picture belongs.

* * * * *